July 10, 1962  E. KARIG ET AL  3,043,154
ROCKER JOINT FOR LINK CHAIN
Filed Feb. 27, 1961
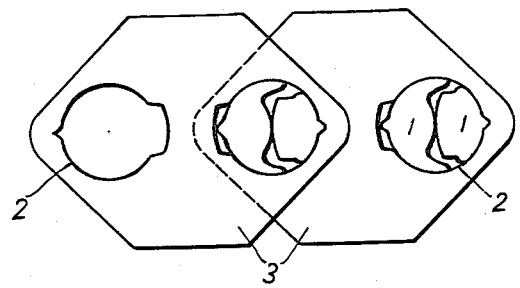
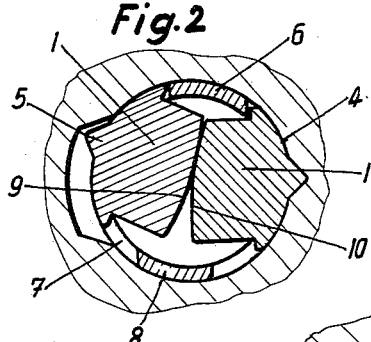 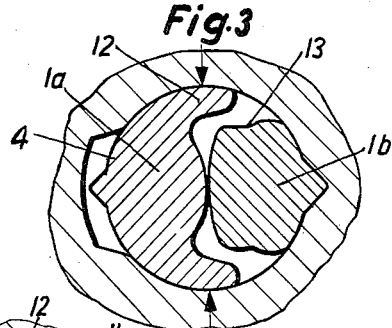
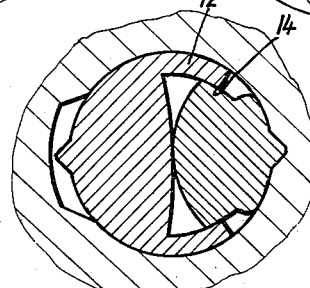
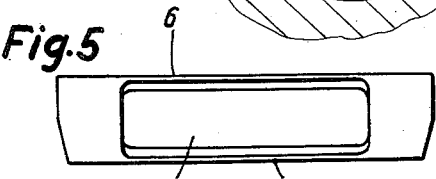 
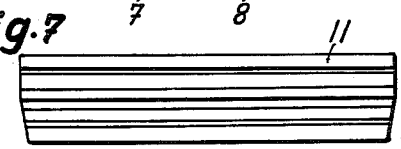 
INVENTORS
Erhardt Karig, Herbert Steuer
and Otto Dittrich
BY
Bailey, Stephens & Huettig
ATTORNEYS

United States Patent Office 3,043,154
Patented July 10, 1962

3,043,154
ROCKER JOINT FOR LINK CHAIN
Erhardt Karig, Herbert Steuer, and Otto Dittrich, Bad Homburg vor der Höhe, Germany, assignors to Reimers Getriebe K.G., Ascona, Switzerland, a firm of Switzerland
Filed Feb. 27, 1961, Ser. No. 91,996
Claims priority, application Germany Mar. 14, 1960
1 Claim. (Cl. 74—253)

The present invention relates to a rocker joint for connecting the interengaging lamellar link plates of a metal link chain.

The known types of rocker joints in which each link pin consists of two parts which roll against each other have, in comparison to round section pins, the disadvantage that the link plates which are connected by these pins are insufficiently guided since the principal contact surfaces of the individual pin parts are disposed in the bores of the link plates in the direction in which the tension is applied upon the chain. The axes of the two bores in each link plate lie within a plane which is hereafter called the "link plane." When the chain bends in running around a pulley or sprocket, these link planes extend tangentially to the chain loop thus formed, while intermediate the pulleys or sprockets the link planes within the tight and loose strands of the chain tension coincide with the direction of the chain tension. Any forces which may occur, for example, by vibrations and clattering of the chain and especially adjacent to the chain loops, and which are acting in a direction vertical to the link plane and thus vertical to the direction of the chain tension and to the lines of contact of the rocking pins with the wall of the bores in the link plates can be taken up only by the more or less sharp edges of the pins between their contact and rocking surfaces within the bores. Due to the continuous pivoting movement of the rocking pins relative to the walls of the bores this disadvantage of the previous structures becomes evident particularly by the fact that the walls of the bores are quickly worn out in a direction vertical to the link plane. The worn walls of the bores then permit the link pins to shift in this vertical direction with the result that the two pins in each bore no longer carry out solely a rocking or rolling movement relative to each other, but that their rocking surfaces also slide along each other. This, in turn, results in an increased wear on the rocking surfaces of the pins as well as on the already worn walls of the bores in the link plates so that the shifting movements of the pins in each bore relative to each other and the wear and abrasion increase progressively. When this wear has once started after the chain has been in operation for a certain length of time, it will not be long until the chain will be entirely useless.

It is an object of the present invention to overcome these disadvantages of the rocking link pins according to prior designs and to do so without reducing the bearing capacity of the pins in the direction of the chain tension, and to provide a pin structure of such a design that the walls of the bores in the link plates will be acted upon in a direction vertical to the link plane to such a small extent that the wear on these walls will be either entirely avoided or at least reduced so as to be in accordance with the general wear on the chain.

This object will be attained according to the invention by providing the associated rocking pins with suitable supporting means which are adapted to support the adjacent link plates relative to each other in a direction vertical to the link plane. Thus, the forces occurring in the longitudinal direction within the link plane will be taken up by the rocking pins in the usual manner, while the transverse forces acting in a direction vertical to the link plane will be taken up by the new supporting means.

According to one preferred feature of the invention, the mentioned supporting means consist of a tubular member which engages with its outer surface with the wall of a bore in each link plate, and which is provided with opposite apertures facing in the direction of the chain tension through which the associated rocking pins within the tubular member project so as to be in positive engagement with the wall of the bore.

The same effect may, according to another feature of the invention, be attained by providing the mentioned supporting means in the form of a tube of a noncircular cross section which has an opening in its wall and is inserted into and locked within a bore in each link plate. This tube surrounds one of the two associated rocking pins completely at the outer side thereof and it also partly encloses the other rocking pin, while the remainder of the latter projects through the opening in the wall of the tube and engages directly into the wall of the bore of each link plate.

A further feature of the invention consists in providing the supporting means in the form of a pair of peripheral extensions on one of the rocking pins which project beyond the center of the joint, while the other pin is provided with corresponding recesses for receiving these extensions. The extensions and recesses on the two rocking pins may also be designed so as to be slidable along each other so that each pin will thus be supported and guided by the other pin.

The abovementioned features produce the advantage that the size of the effective contact surface between the walls of the bores in the link plates and the rocking pins which extends vertically to the link plane will be considerably increased, and that the contact pressure will be reduced accordingly. The effect of these features is that, while the link plates are turned relative to each other, they will be guided as if by a solid pin with the result that the load upon the walls of the bores in the link plates will be considerably reduced so that the wear and abrasion upon these walls in a direction vertical to the link plane will no longer occur.

The present invention and its features and advantages will become further evident from the following detailed description of several embodiments thereof, as illustrated in the accompanying sheet of drawings, in which—

FIGURE 1 shows a side view of a metal link chain with rocking link pins according to the invention;

FIGURE 2 shows a cross section of a rocker joint with a pair of equal rocking pins and a cage tube;

FIGURES 3 and 4 show cross sections of two different embodiments of a rocker joint with a pair of unequal rocking pins;

FIGURE 5 shows a side view of a cage tube which is provided with a pair of windowlike apertures;

FIGURE 6 shows a cross section of a cage tube according to FIGURE 5;

FIGURE 7 shows a side view of a profiled cage tube which has an opening at one side, while FIGURE 8 shows a cross section of the cage tube according to FIGURE 7.

Referring particularly to FIGURES 1 and 2, the rocking link pins 1 are provided in pairs and are inserted in the conventional manner into the bores 2 in the link plates of a chain 3. Each pin 1 engages with its back 4 against the walls of bores 2 and is locked against rotation by a projection 5. Into each bore 2 a cage tube 6 is inserted which is provided with a pair of opposite apertures 7 for receiving the two pins 1. The two webs 8 of cage tube 6 engage with the wall of bore 2, and the walls of apertures 7 partly surround link pins 1. When such a chain 3 is moving, the curved rocking surface 9 rolls along the corresponding surface 10, and cage tube 6 then turns within bore 2. At the same time, pins 1 carry out a small rotary movement in aperture 7 of cage tube 6. The projections 5 on pins 1 always insure that webs 8 of cage tube 6 remain in a position in which they extend substantially vertically to the direction of the tension and thereby take up the transverse forces occurring within bore 2.

Instead of providing a cage tube 6 of a shape as illustrated in FIGURE 2, it is also possible to apply a profiled tube 11, which has an inner indentation forming an outer projection as shown in FIGURES 7 and 8, and has an opening at one side. This tube partly encloses and supports both rocking pins at the outer sides thereof.

FIGURE 3 illustrates a pair of rocking pins, one of which partly encircles the other pin. For this purpose, pin 1a has peripheral extensions 12 which surround the recessed parts 13 of pin 1b. These recessed parts 13 between the extensions 12 on pin 1a are designed so as to permit pin 1b to move freely. The transverse force acting within bores 2 in the direction of the arrows will then be taken up by the extensions 12 and be distributed thereby along the periphery of bores 2. When chain 3 is moving, pins 1a and 1b may then turn freely to the extent as defined by the recesses 13 on pin 1b.

The extensions 12 on one rocking pin and the recesses 13 on the other pin may, however, also be designed in the manner as shown in FIGURE 4 so that, when pins 1a and 1b roll along each other, they will be guided by each other along the surfaces 14 in a direction transverse to the direction of the tension of the chain.

Although our invention has been illustrated and described with reference to the preferred embodiments thereof, we wish to have it understood that it is in no way limited to the details of such embodiments, but is capable of numerous modifications within the scope of the appended claim.

Having thus fully disclosed our invention, what we claim is:

A rocket joint for a metal link chain comprising interengaging lamellar link plates with bores therein, a link pin in said bores comprising at least two rocking pins adapted to rock on each other, and supporting means within said bores for supporting adjacent link plates relative to each other in a direction vertical to the link plane, said supporting means comprising a tubular member surrounding said rocking pins and having outer surface parts engaging with the walls of said bores in said link plates, and further having opposite apertures facing in the direction of the chain tension, said rocking pins projecting through said apertures and engaging with the walls of said bores.

References Cited in the file of this patent
UNITED STATES PATENTS

Re. 12,844    Morse _____ Apr. 19, 1904

FOREIGN PATENTS 2,128    Great Britain _____ 1898
8,736    Great Britain _____ 1911